No. 731,926. PATENTED JUNE 23, 1903.
A. S. MARTIN.
LAMP STOVE.
APPLICATION FILED APR. 6, 1903.
NO MODEL.
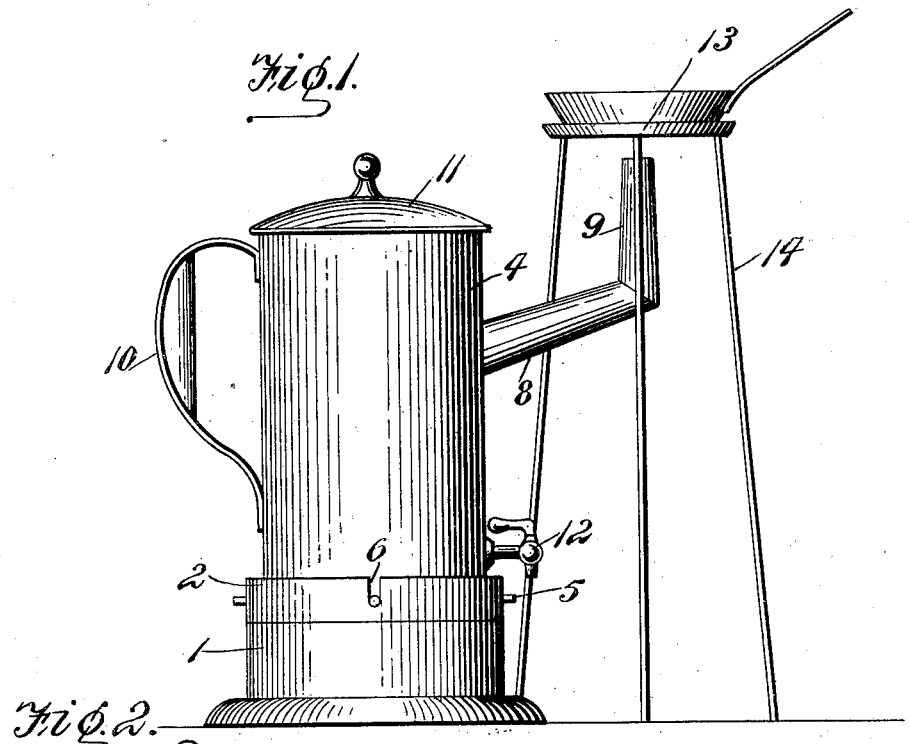
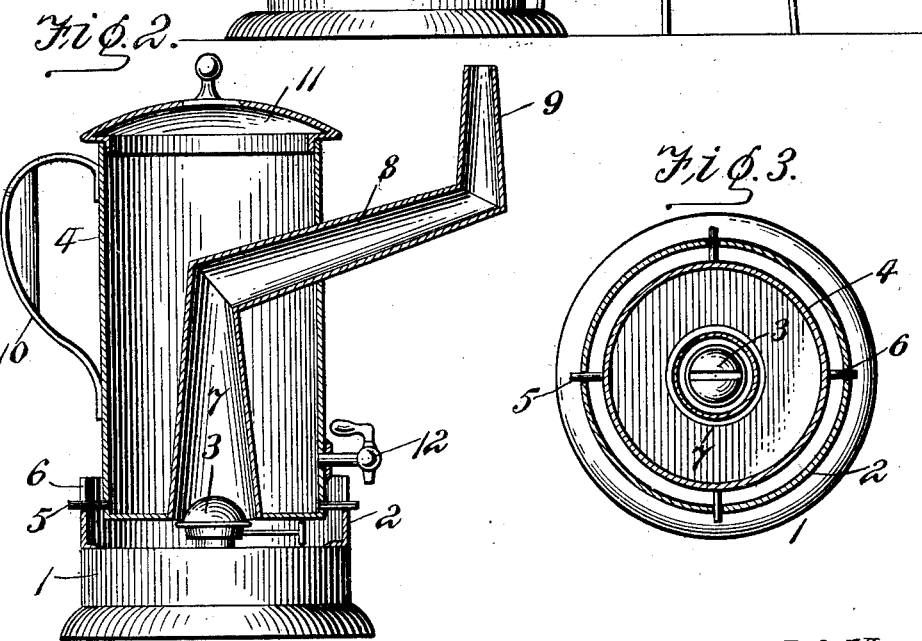
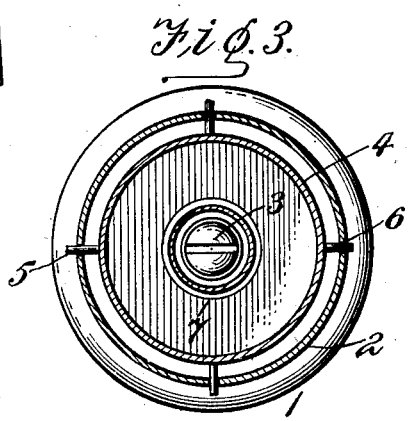
Witnesses
G. V. Worthington
Inventor
A. S. Martin
By H. B. Willson
Attorney No. 731,926. Patented June 23, 1903.

UNITED STATES PATENT OFFICE.

ANTHONY S. MARTIN, OF MAIDEN, NORTH CAROLINA, ASSIGNOR OF ONE-HALF TO S. A. ROBERTSON, OF GRANITE QUARRY, NORTH CAROLINA.

LAMP-STOVE.

SPECIFICATION forming part of Letters Patent No. 731,926, dated June 23, 1903.

Application filed April 6, 1903. Serial No. 151,388. (No model.)

*To all whom it may concern:*

Be it known that I, ANTHONY S. MARTIN, a citizen of the United States, residing at Maiden, in the county of Catawba and State of North Carolina, have invented certain new and useful Improvements in Lamp-Stoves; and I do declare the following to be a full, clear, and exact description of the invention, such as will enable others skilled in the art to which it appertains to make and use the same.

This invention relates to new and useful improvements in lamp-stoves; and it consists in attachments for an oil-lamp by means of which coffee and tea may be made, water may be boiled, and light cooking may be done without the trouble and expense of building a fire in the kitchen-stove.

The object of the invention is to provide a device of this character which is simple in construction, durable in use, efficient in operation, and comparatively inexpensive of production.

With these and other objects in view the invention consists of certain novel features of construction, combination, and arrangement of parts, as will be more fully described, and particularly pointed out in the appended claims.

In the drawings, Figure 1 is a side elevation of my invention. Fig. 2 is a vertical sectional view through the same. Fig. 3 is a detail sectional view.

Referring to the drawings, the numeral 1 denotes the body or oil-reservoir of an ordinary lamp, 2 a vertical flange or rim surrounding the top of the reservoir, and 3 the burner.

4 denotes a removable vessel or pot supported by the flange 2 of the lamp. This coffee or tea pot 4 is of less diameter than the diameter of the body and flange 2 and is provided at intervals around its bottom with the studs or pins 5, which engage the vertical slots 6 in the top of the surrounding flange 2 in order to support the pot or vessel upon the lamp. Said vessel 4 is formed with a central conical draft-funnel 7, which has its large lower end directly above the burner 3 and its upper end connected with the flue 8, which projects at an angle through the side of the vessel and is formed with the vertical portion 9. The draft-funnel 7 projects vertically from the bottom of the pot or vessel and is surrounded by the contents of the same, which will be heated to an intense degree by contact therewith. Said vessel is provided with the handle 10, the removable cover 11, and the faucet or spigot 12, by means of which the contents of the vessel may be drawn off. It will thus be seen that coffee or tea may be made, water heated, eggs boiled, &c., in the vessel 4 by the heat of the lamp passing from the burner 2 up through the draft-funnel 7 and flue 8.

In order to do light cooking—such as frying eggs, meat, &c., and cooking cereals, vegetables, and the like—I provide a griddle 13, which is supported above the upper end of the flue 9 by the tripod or frame 14, consisting of the three supporting-legs. A frying-pan or cooking-pot may be supported upon this preferably open-work griddle, and the heat from the lamp will be sufficient to cook the contents of such pan or pot. Since the vessel 4 is of less diameter than the surrounding rim 2, the air passing down between these parts will be sufficient draft for the burner; but, if desired, I may provide the rim with a series of perforations or draft-openings.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. In a device of the character described, the combination with a lamp having a burner and a slotted flange or rim, of a pot or vessel formed with an interior draft-funnel and flue to coact with the burner, and with studs or pins adapted to engage the slots in the rim or flange in order to support said vessel, substantially as described.

2. In a device of the character described, the combination with a lamp having a burner and a slotted flange or rim, of a pot or vessel provided with studs or pins to engage the slots in said rim, and with a central draft-funnel having an outwardly and upwardly projecting flue, and a griddle supported above said flue upon a tripod-frame, substantially as described.

3. A device of the character described comprising a lamp provided with a slotted flange or rim, a pot or vessel, studs or pins upon said vessel adapted to engage the slots in said rim, a central conical draft-funnel in said vessel, an outwardly and upwardly projecting flue connected with said draft-funnel, a griddle, and legs supporting said griddle above said flue, substantially as described.

In testimony whereof I have hereunto set my hand in presence of two subscribing witnesses.

ANTHONY S. MARTIN.

Witnesses:
M. H. YOUNT,
R. J. MAUSER.